United States Patent
Shofer et al.

(10) Patent No.: US 8,366,927 B2
(45) Date of Patent: Feb. 5, 2013

(54) DEVICE FOR ALTERING MOLECULAR BONDS IN FLUIDS

(75) Inventors: Howard L. Shofer, Naples, FL (US); Douglas J. Tinsler, Naples, FL (US)

(73) Assignee: Combustive Control Systems CCS Corporation, Annapolis, MD (US)

( * ) Notice: Subject to any disclaimer, the term of this patent is extended or adjusted under 35 U.S.C. 154(b) by 144 days.

(21) Appl. No.: 12/838,663

(22) Filed: Jul. 19, 2010

(65) Prior Publication Data

US 2012/0014844 A1    Jan. 19, 2012

(51) Int. Cl.
*F02M 27/00* (2006.01)
*B01D 35/06* (2006.01)

(52) U.S. Cl. .......................... 210/222; 123/538
(58) Field of Classification Search ............ 123/538
See application file for complete search history.

(56) References Cited

U.S. PATENT DOCUMENTS

| | | | |
|---|---|---|---|
| 2,149,764 A * | 3/1939 | Frei | 210/223 |
| 3,614,691 A | 10/1971 | Miyata | |
| 4,146,479 A * | 3/1979 | Brown | 210/222 |
| 4,357,237 A * | 11/1982 | Sanderson | 210/222 |
| 4,372,852 A | 2/1983 | Kovacs | |
| 4,414,951 A | 11/1983 | Saneto | |
| 4,422,934 A | 12/1983 | Debney et al. | |
| 4,469,076 A | 9/1984 | Wolff | |
| 4,505,815 A * | 3/1985 | Lindler | 210/223 |
| 4,519,919 A | 5/1985 | Whyte et al. | |
| 4,564,448 A * | 1/1986 | O'Meara, Jr. | 210/222 |
| 4,569,737 A | 2/1986 | Sakata | |
| 4,611,615 A * | 9/1986 | Petrovic | 137/13 |
| 4,662,314 A * | 5/1987 | Moore, Jr. | 122/379 |
| 4,716,024 A | 12/1987 | Pera | |
| 4,935,133 A | 6/1990 | Hirama | |
| 5,076,246 A | 12/1991 | Onyszczuk | |
| 5,221,471 A * | 6/1993 | Huntley | 210/222 |
| 5,460,144 A | 10/1995 | Park et al. | |
| 5,487,370 A | 1/1996 | Miyazaki | |
| 5,664,546 A | 9/1997 | De La Torre Barreiro | |
| 5,873,353 A | 2/1999 | Makita | |
| 5,882,514 A | 3/1999 | Fletcher | |

(Continued)

FOREIGN PATENT DOCUMENTS

JP    2002227729    8/2002

*Primary Examiner* — Tony G Soohoo
*Assistant Examiner* — David C Mellon
(74) *Attorney, Agent, or Firm* — Edward M. Livingston, Esq.; Bryan L. Loeffler, Esq.; The Livingston Firm

(57) ABSTRACT

A device for altering molecular bonds in fluids (1) having a substantially tubular housing (2). The substantially tubular housing has a perimeter wall (3), a first end (4), a second end (5), an inner surface (6) and an outer surface (7). Caps (8) are located on the first end and on the second end. One or more geometrically shaped extensions (11) may be located on the caps to allow a user to rotate the caps and/or the entire housing with a wrench. An aperture is located on each cap to allow liquid to pass though into or out of the housing. Threads (10) are located within the apertures to allow a user to install the device for altering molecular bonds in fluids in a fuel line, water line or other liquid conduit. A plurality of magnets (13) are secured within one or more casings (14) that separate and hold the magnets in place within the housing.

1 Claim, 5 Drawing Sheets

U.S. PATENT DOCUMENTS

| | | |
|---|---|---|
| 6,000,382 A | 12/1999 | Albisetti |
| 6,019,092 A | 2/2000 | Gilligan |
| 6,143,171 A | 11/2000 | Van Arsen |
| 6,361,689 B1 | 3/2002 | Munzing |
| 6,386,187 B1 | 5/2002 | Phykitt |
| 6,450,155 B1 | 9/2002 | Arkfeld |
| 7,351,337 B1 | 4/2008 | Milo et al. |
| 7,377,268 B2 | 5/2008 | Lu |
| 7,434,569 B2 | 10/2008 | Wang |
| 2003/0168393 A1 | 9/2003 | Tsunematsu |
| 2005/0056578 A1 | 3/2005 | Switzer et al. |
| 2007/0227958 A1 | 10/2007 | Meeks |
| 2009/0013976 A1 | 1/2009 | Mori |
| 2009/0050115 A1 | 2/2009 | Szalai |

* cited by examiner

US 8,366,927 B2

DEVICE FOR ALTERING MOLECULAR BONDS IN FLUIDS

BACKGROUND OF THE INVENTION

This invention relates to devices used for the treatment fuels and other liquids, more particularly, a device that breaks down and separates molecules within fuel causing the broken down molecules to burn more efficiently, thereby reducing build up of carbon in an engine and environmentally harmful emissions.

Molecules in liquids such as fuel, especially diesel fuel, have a tendency to bond to each other due to the opposite charges located on the molecules. The coagulation of particulate matter within fuel is especially a problem in fuel that has been stored for long periods of time. These bonds create groups of molecules which appears as a sludge to the human eye. The groups of molecules can clog fuel filters, clog fuel injectors and damage engines. Furthermore, these groups of molecules do not completely burn in the engine. Instead, only the outer portion of these large groups of molecules burn leaving the charred inner portions behind. The charred inner portions of these large groups of molecules create carbon deposits within engines and harmful emissions into the atmosphere in the for of particulate matter.

Conventional methods designed to control these problems include the use of apparatuses, such as Diesel Oxidation Catalysts (DOCs), Diesel Particulate Filters (DPFs), Closed Crankcase Ventilation (CCV) or fuel additives that include Urea, none of which address the problem associated with the coagulation of particulate matter prior to the fuel entering the engine, thereby still resulting in clogged fuel filters and carbon deposit build-up within an engine. In addition, these conventional methods are costly and require on-going maintenance in order to have any benefit to the user.

Although, there have been prior attempts at solving this problem using magnets to neutralize the charges of the molecules in fuel so the molecules do not attract to each other and coagulate, many of these prior devices have been ineffective because they do not provide for an adequate flow of fuel through the apparatus to the engine.

Therefore, a need exists for a device that will neutralize the charges of the molecules in fuel and other liquids while not impeding the flow of fuel to an engine.

The relevant prior art includes the following references:

| Pat. No. (U.S. unless stated otherwise) | Inventor | Issue/Publication Date |
| --- | --- | --- |
| 2009/0050115 | Szalai | Feb. 26, 2009 |
| 2009/0013976 | Mori | Jan. 15, 2009 |
| 7,434,569 | Wang | Oct. 14, 2008 |
| 7,377,268 | Lu | May 27, 2008 |
| 7,351,337 | Milo et al. | Apr. 01, 2008 |
| 2007/0227958 | Meeks | Oct. 04, 2007 |
| 2008/0056578 | Switzer et al. | Mar. 17, 2005 |
| 2003/0168393 | Tsunematsu | Sep. 11, 2003 |
| 6,450,155 | Arkfeld | Sep. 17, 2002 |
| JP2002227729 | Ota et al. | Aug. 14, 2002 |
| 6,386,187 | Phykitt | May 14, 2002 |
| 6,361,689 | Munzing | Mar. 26, 2002 |
| 6,143,171 | Van Arsen | Nov. 07, 2000 |
| 6,019,092 | Gilligan | Feb. 01, 2000 |
| 6,000,382 | Albisetti | Dec. 14, 1999 |
| 5,882,514 | Fletcher | Apr. 16, 1999 |
| 5,873,353 | Makita | Feb. 23, 1999 |
| 5,664,546 | De La Torre Barreiro | Sep. 09, 1997 |
| 5,487,370 | Miyazaki | Jan. 30, 1996 |
| 5,460,144 | Park et al. | Oct. 24, 1995 |
| 5,076,246 | Onyszczuk | Dec. 31, 1991 |
| 4,935,133 | Hirama | Jun. 19, 1990 |
| 4,716,024 | Pera | Dec. 29, 1987 |
| 4,569,737 | Sakata | Feb. 11, 1986 |
| 4,519,919 | Whyte et al. | May 28, 1985 |
| 4,469,076 | Wolff | Sep. 04, 1984 |
| 4,422,934 | Debney et al. | Dec. 27, 1983 |
| 4,414,951 | Saneto | Nov. 15, 1983 |
| 4,372,852 | Kovacs | Feb. 08, 1983 |
| 3,614,691 | Miyata | Oct. 19, 1971 |

SUMMARY OF THE INVENTION

The primary object of the present invention is to provide device for altering molecular bonds in fluids that prevents the coagulation of particulate matter in fluids.

An additional object of the present invention is to provide a device for altering molecular bonds in fluids that eradicates pre-existing carbon and reduces the build up of carbon in engines.

Another object of the present invention is to provide a device for altering molecular bonds in fluids that reduces environmentally harmful emissions of particulate matter into the atmosphere.

An even further object of the present invention is to provide a device for altering molecular bonds in fluids that will extend the useful life of fuel filters.

Another object of the present invention is to provide a device for altering molecular bonds in fluids that increases the useful life of an engine.

Another object of the present invention is to provide a device for altering molecular bonds in fluids that increases fuel efficiency.

An even further object of the present invention is to provide a device for altering molecular bonds in fluids that reduces $CO_2$ emissions into the atmosphere.

An additional object of the present invention is to provide a device for altering molecular bonds in fluids that reduces NO emissions into the atmosphere.

The present invention fulfills the above and other objects by providing a device for altering molecular bonds in fluids comprising a substantially tubular housing having a perimeter wall, a first end, a second end, an inner surface and an outer surface. Caps are located on the first end and on the second end of the housing. An aperture is located on each cap to allow liquid to pass into and out of the housing when installed in a fuel line, water line or other liquid conduit. An attachment means, such as threads, are located within each aperture. The attachment means allows a user to install the device in a fuel line, water line, or other liquid conduit. A plurality of engineered magnets are secured within one or more casings having a spacing means located therein that separates the magnets from one another by preventing similar poles of the magnets from attracting each other. The placement of the casings withing the housing in conjunction with the preferably cylindrical shape of the casings allows for fluid to easily flow through the housing and around the magnets without slowing the flow of liquid through a fuel line, water line, or other liquid conduit. In addition, the casing prevents shifting of the magnets caused from outside vibrations.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
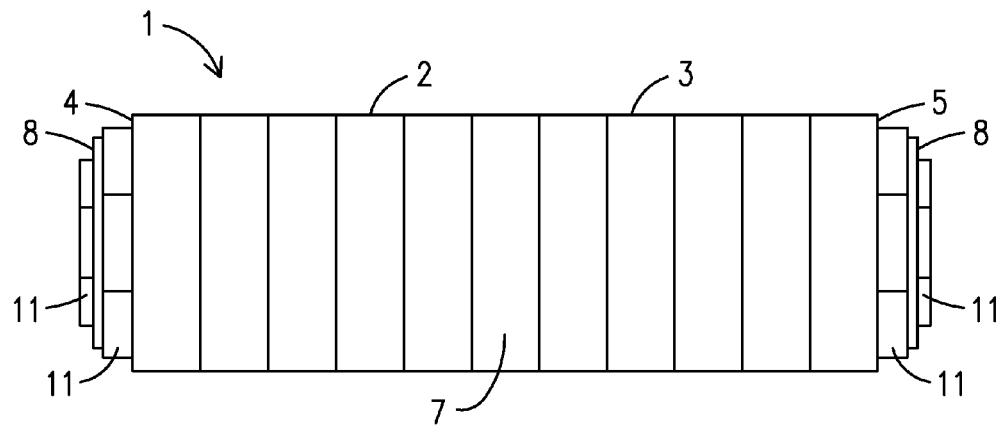
FIG. 1 is a side view of a device for altering molecular bonds in fluids of the present invention.

For purposes of describing the preferred embodiment, the terminology used in reference to the numbered components in the drawings is as follows:

| | |
|---|---|
| 1. | device, generally |
| 2. | housing |
| 3. | perimeter wall |
| 4. | first end |
| 5. | second end |
| 6. | inner surface |
| 7. | outer surface |
| 8. | cap |
| 9. | attachment means |
| 10. | threads |
| 11. | geometric extension |
| 12. | aperture |
| 13. | magnet |
| 14. | casing |
| 15. | spacing means |
| 16. | outer wall |
| 17. | slot |
| 18. | flange |
| 19. | end portion |
| 20. | center portion |
| 21. | cross member |
| 22. | connection means |
| 23. | elongated tubular housing |
| 24. | hole |
| 25. | spacer |
| 26. | locking means |
| 27. | center post |
| 28. | extension post |
| 29. | O-ring |

Figure 2:
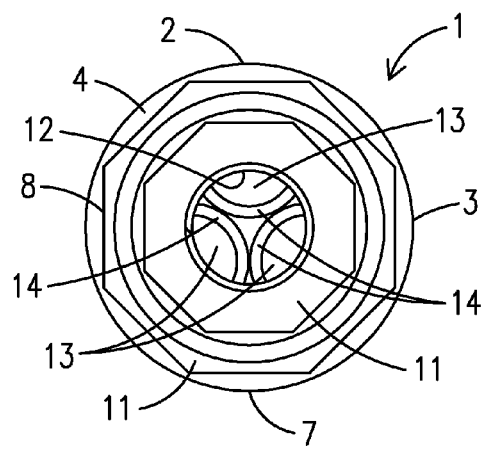
FIG. 2 is an end view of a device for altering molecular bonds in fluids of the present invention.
Figure 3:
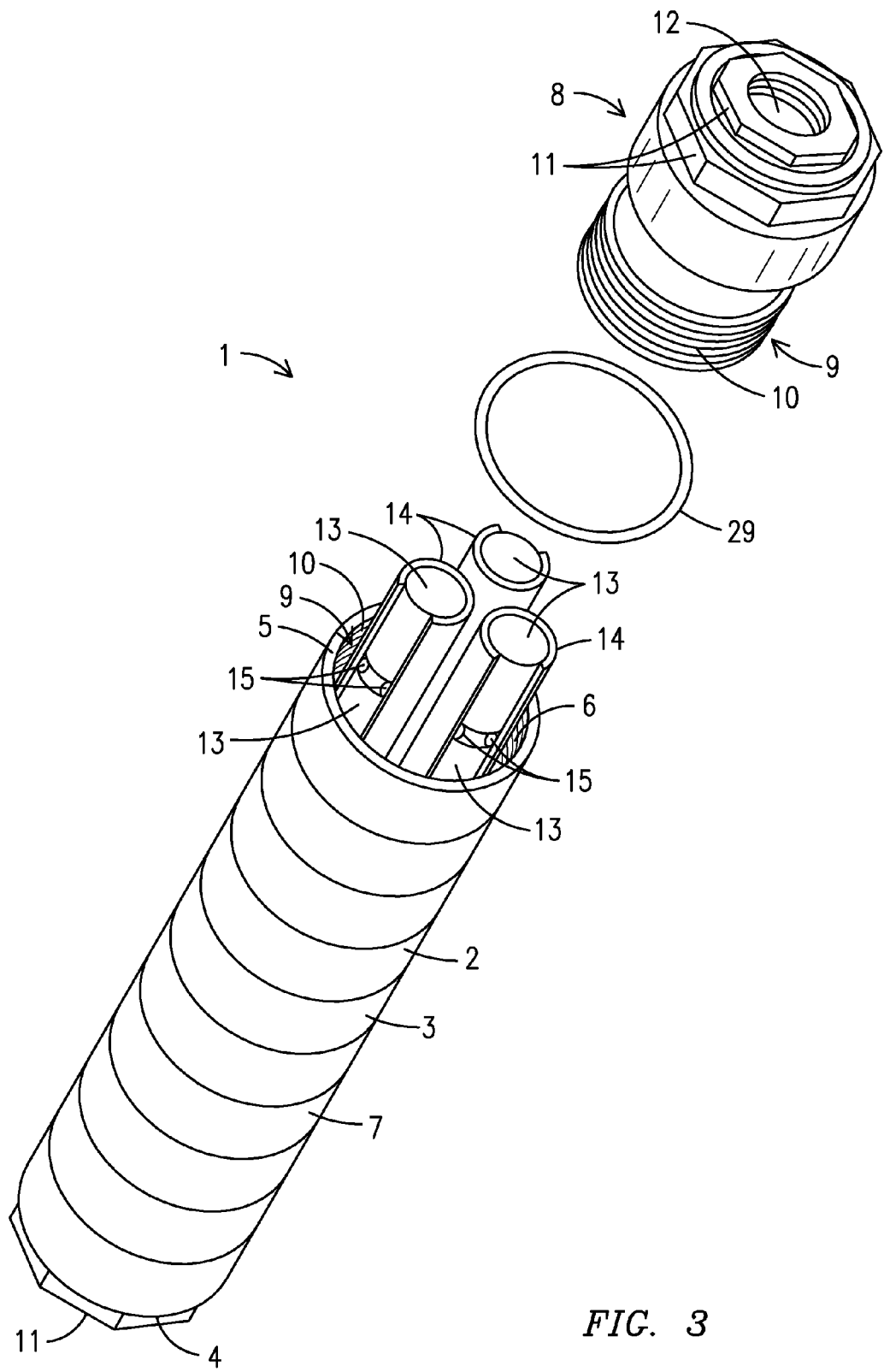
FIG. 3 is an end side perspective exploded view of a device for altering molecular bonds in fluids of the present invention.

With reference to FIGS. 1, 2, and 3, a side view, an end view and an end side perspective exploded view, respectively, of a device for altering molecular bonds in fluids 1 of the present invention are shown. The device 1 comprises a substantially tubular hollow housing 2 having a perimeter wall 3. The perimeter wall 3 having a first end 4, a second end 5, an inner surface 6 and an outer surface 7. Caps 8 are located on the first end 4 and on the second end 5. The cap 8 may be an integral part of the housing 2 or removably attachable to the perimeter wall 3 via an attachment means 9, such as threads 10. A washer or O-ring 29 is located in between the removable cap 8 and the housing 2 to create a leak-proof seal. One or more geometrically shaped extensions 11 may be located on the caps 8 to allow a user to rotate the one of the caps 8 and/or the entire housing 2 with a wrench. An aperture 12 is located on each cap 8 to allow liquid to pass into or out of the housing depending on the orientation of the device 1 when installed in a fuel line, water line, etc. An attachment means 9, such as threads 10, are located within the apertures 12. The attachment means 9 located in the apertures 12 allows a user to install the device for altering molecular bonds in fluids 1 in a fuel line, water line, etc. A plurality of magnets 13 are secured within one or more round casings 14 having a spacing means 15 that separates the magnets 13 from one another by preventing similar poles of the magnets 13 from attracting each other. The placement of the casings 14 withing the housing 2 in conjunction with the preferably round shape of the casings 14 allows for fluid to easily flow through the housing 2 and around the magnets 13 without slowing the flow of liquid through a fuel line, water line or other liquid conduit.

Figure 4:
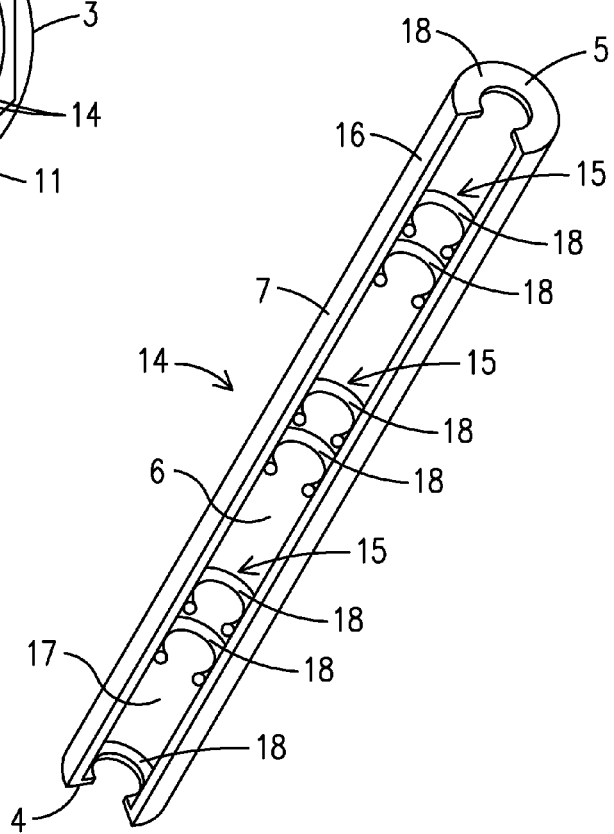
FIG. 4 is an end side perspective view of a casing of the present invention that uses a pressure fit to secure magnets within the casing.
Figure 5:
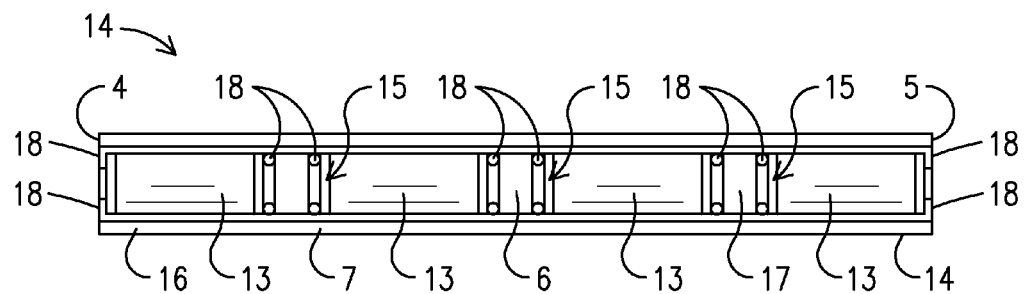
FIG. 5 is a side perspective view of a casing of FIG. 4 of the present invention having magnets located therein.

With reference to FIGS. 4 and 5, an end side perspective view of a casing 14 of the device 1 that uses a pressure fit to secure magnets 13 within the casing 14 and a side view of the casing 14 having magnets 13 located therein are shown. The casing 14 comprises an outer wall 16 that is substantially C-shaped having an inner surface 6, an outer surface 7, a first end 4, a second end 5 and a slot 17 that runs lengthwise along the casing 14. A plurality of spacing means 15, such as ridges 18 shown in FIGS. 4 and 5, but may also comprise of walls, pieces of non-magnetic material and so forth, are located at predetermined locations along the inner surface 6 of the casing 14. The ridges 18 shown here extend outward from the inner surface 6 of the casing 14 towards the center of the casing 14. The spacing means 15 separates magnets 13 located within the casing 14 from one another by preventing opposite poles of the magnets 13 from attracting to each other, which could adversely affect the flow of fluid through the device 1. The casing 14 is preferably made of a semi-flexible material, such as plastic, that will allow a user to insert a magnet 13 through the slot 17 into the substantially C-shaped outer wall 16. The C-shaped outer wall 16 then holds the magnet 13 within the casing 14 with a pressure fit. Flanges 18 located at both ends of the casing 14 work to further hold the magnets 13 within the casing 14. Multiple casings 14 having magnets 13 located therein may be placed within a housing 2, as shown in FIG. 3.

Figure 6:
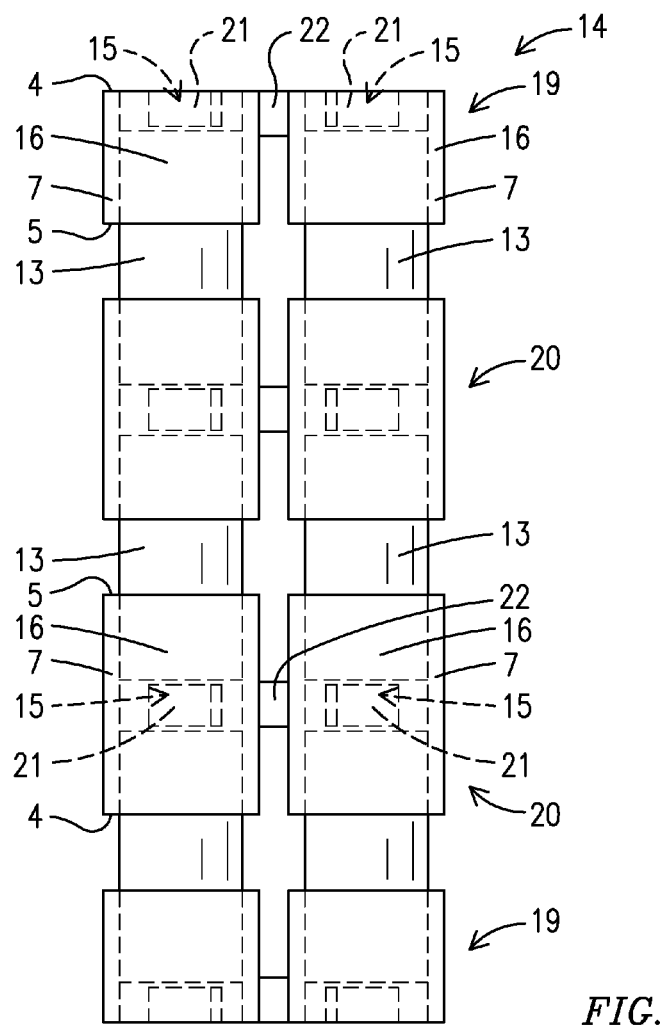
FIG. 6 is a side plan view of a casing of the present invention comprising end portions and center portions.

With reference to FIG. 6, a side view of a casing 14 of the present invention comprising end potions 19 and center portions 20 is shown. The end portions 19 and center portions 20 each comprise a plurality of tubular shaped outer walls 16 having an inner surface 6, an outer surface 7, a first end 4, a second end 5. The end portions 19 and center portions 20 further comprise a spacing means 15, such as a cross member 21, located within each outer wall 16. The plurality of tubular shaped outer walls 16 of each end portion 19 and each center portion 20 are connected to each other via connection means 22, which provides even spacing between the tubular shaped outer walls 16 of each end portion 19 and the tubular shaped outer walls 16 of each center portion 20 to allow for the flow of fluid in and around the casing 14. To use the casing 14, a user first places the end of one or more magnets 13 within each tubular shaped outer wall 16 of an end portion 19. Then, the user places a center portion 20 over the opposite end of the one or more magnets 13 so that the opposite ends of the one or more magnets 13 are located within the tubular shaped outer walls 16 of the center portion 20. The user then repeats this process using center portions 20 to hold and separate the magnets 13 until the desired number of magnets 13 are reached. Then, an end portion 19 is placed over the last group of magnets. The casing 14 having magnets 13 located therein may be placed within a housing 2, as shown in FIG. 3.

Figure 7:
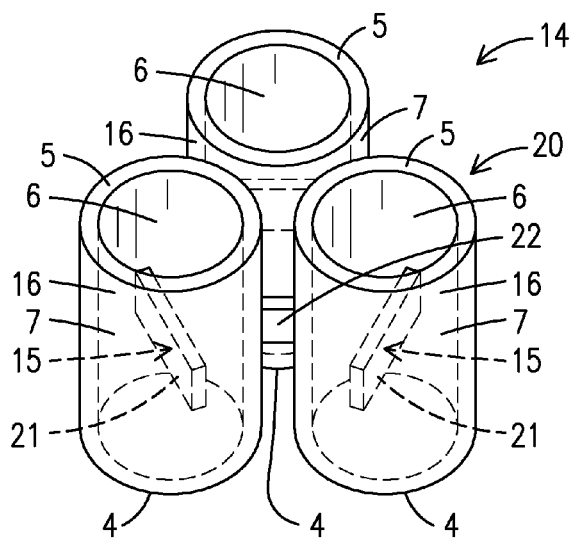
FIG. 7 is a top side perspective plan view of a center portion of the casing of the present invention.
Figure 8:
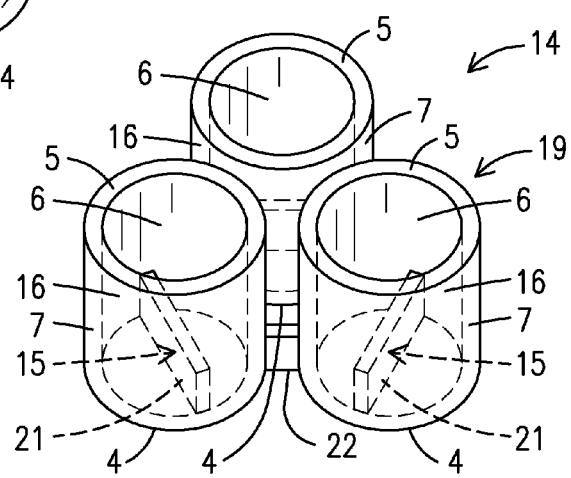
FIG. 8 is a top view of a center portion of the casing of the present invention.

With reference to FIGS. 7 and 8, a top side perspective plan view and a top view, respectively, of a center portion 20 of the casing 14 of the present invention are shown. The center portion 20 comprises a plurality of tubular shaped outer walls 16 having an inner surface 6, an outer surface 7, a first end 4 and a second end 5. The center portion 20 further comprises a spacing means 15, such as a cross member 21, located within each outer wall 16. The spacing means 15 is located near the middle portion of each tubular shaped outer wall 16 so that magnets 13 may be placed in the top or bottom of the center portion 20, as shown previously in FIG. 6. The plurality of tubular shaped outer walls 16 of the center portion 20 are connected to each other via connection means 22, which provides even spacing between the tubular shaped outer walls 16 of each center portion 20 to allow for the flow of fluid in and around the casing 14.

Figure 9:
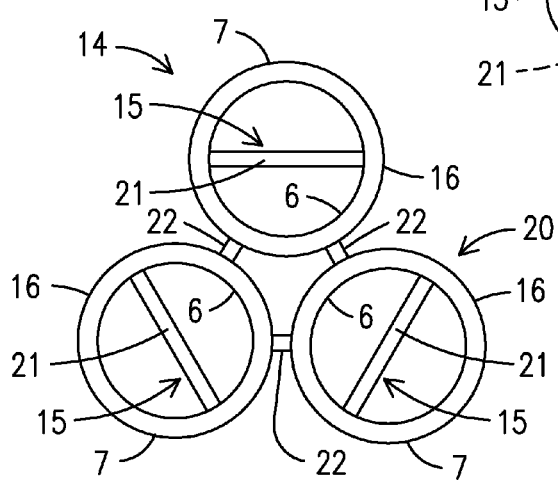
FIG. 9 is a top side perspective plan view of an end portion of the casing of the present invention.
Figure 10:
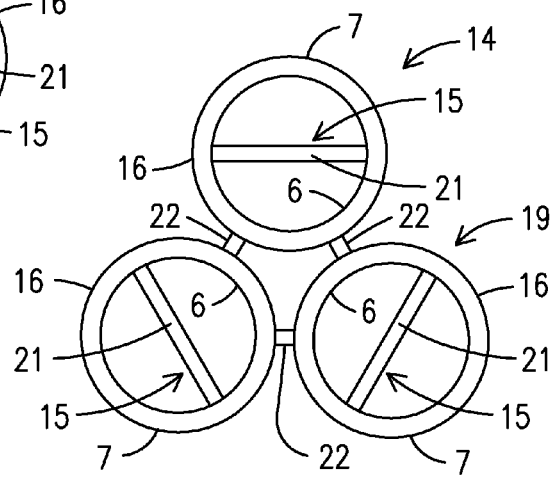
FIG. 10 is a top view of an end portion of the casing of the present invention.

With reference to FIGS. 9 and 10, a top side perspective plan view and a top view, respectively, of an end portion 19 of the casing 14 of the present invention shown in FIG. 6 are shown. The end portion 19 comprises a plurality of tubular shaped outer walls 16 having an inner surface 6, an outer surface 7, a first end 4 and a second end 5. The center portion 20 further comprises a spacing means 15, such as a cross member 21, located within each outer wall 16. The spacing means 15 is located near the bottom portion of each tubular shaped outer wall 16 so that magnets 13 may be placed in the top of the end portion 19, as shown previously in FIG. 6. The plurality of tubular shaped outer walls 16 of the end portion 19 are connected to each other via connection means 22, which provides even spacing between the tubular shaped outer walls 16 of each end portion 19 to allow for the flow of fluid in and around the casing 14.

Figure 12:
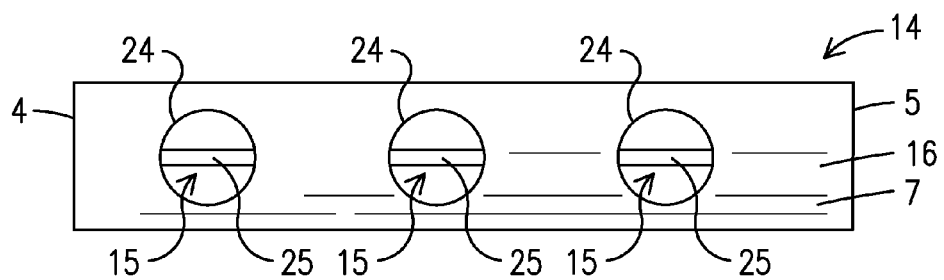
FIG. 12 is a side view of a casing of the present invention having an elongated tubular housing.
Figure 11:
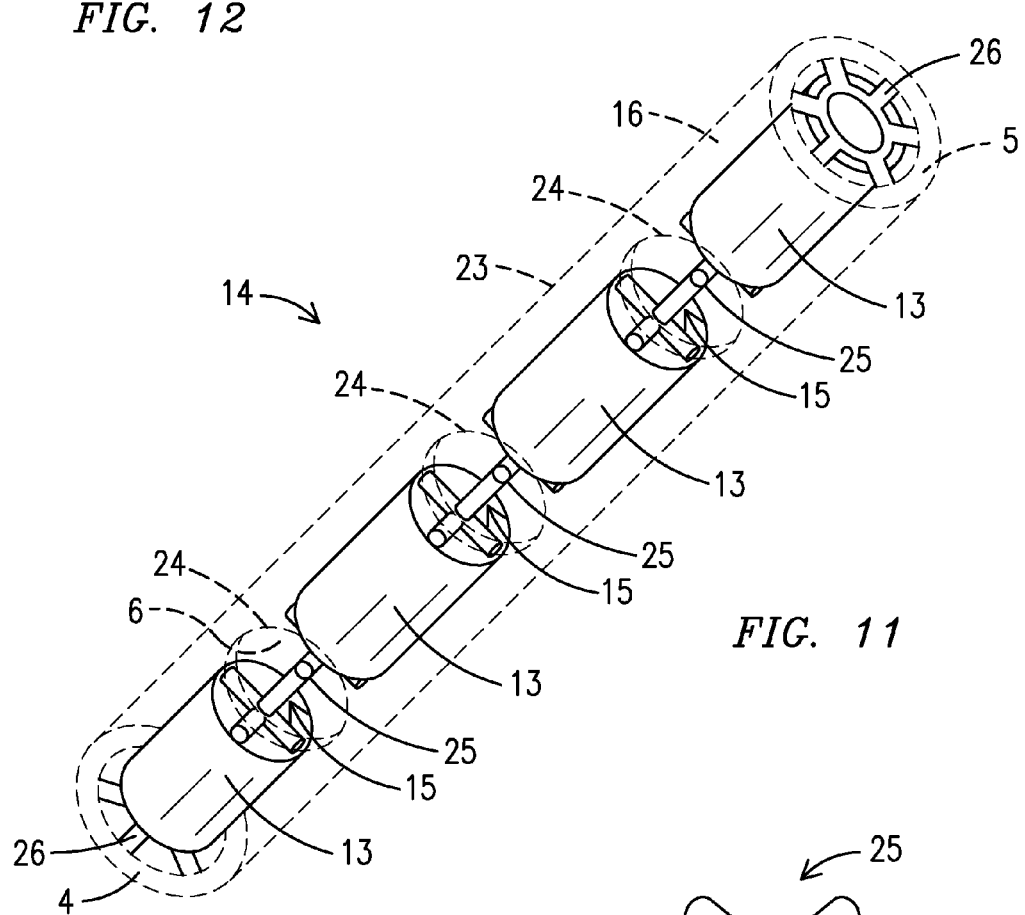
FIG. 11 is a top side perspective plan view of a casing of the present invention having an elongated tubular housing.

With reference to FIGS. 11 and 12, a top side perspective plan view and a side view, respectively, of a casing 14 of the present invention having an elongated tubular housing 23 are shown. The elongated tubular housing 23 comprises an outer wall 16 having an inner surface 6, an outer surface 7, a first end 4 and a second end 5. The elongated tubular housing 23 further comprises a plurality of holes 24 located at predetermined locations along the outer wall 16. A plurality of spacing means 15, such as spacers 25 (as shown further in FIG. 13), are located within the elongated tubular housing 23 of the casing 14. The spacing means 15 separates magnets 13 located within the casing 14 from one another by preventing similar poles of the magnets 13 from attracting each other. A locking means 26 is located in each end of the elongated tubular housing 23. The locking means 26 prevents the magnets 13 from sliding out of the casing 14. The plurality of holes 24 located at predetermined locations along the outer wall allow for the flow of liquid through the casing 14. Multiple casings 14 having magnets 13 located therein may be placed within a housing 2, as shown in FIG. 3.

Figure 13:
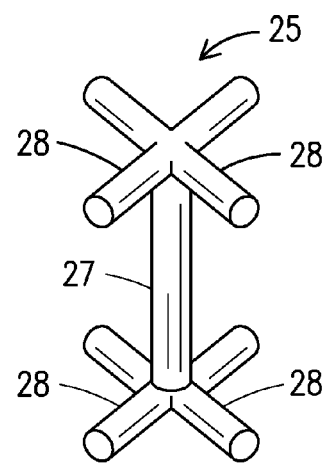
FIG. 13 is a top side view of a spacer of the present invention.

Finally, with reference to FIG. 13, a top side view of a spacer 25 of the present invention is shown. The spacer 25 comprises a center post 27 having a plurality of extension posts 28 extending from each end of the center posts 27 so that the extension posts 28 are substantially perpendicular to the center post 27. The shape of the space 25 allows for increase flow of liquid through the casing 14, as shown in FIGS. 11 and 12.

It is to be understood that while a preferred embodiment of the invention is illustrated, it is not to be limited to the specific form or arrangement of parts or use herein described and shown. It will be apparent to those skilled in the art that various changes may be made without departing from the scope of the invention and the invention is not be considered limited to what is shown and described in the specification and drawings.

We claim:

1. A device for altering molecular bonds in fluids comprising:
   a housing having a perimeter wall;
   said perimeter wall having a first end, a second end, an inner surface and an outer surface;
   a cap located on the first end of the perimeter wall, said cap having an aperture located therein;
   a cap located on the second end of the perimeter wall, said cap having an aperture located therein;
   at least one casing located within the housing;
   said at least one casing comprising a substantially C-shaped outer wall having a first end, a second end, an inner surface and an outer surface;
   a slot that runs lengthwise along the substantially C-shaped outer wall;
   at least two magnets located within the substantially C-shaped outer wall and separated from each other by spacing means that prevents the at least two magnets from coming into contact with each other,
   a substantially C-shaped flange located on the first end of the substantially C-shaped outer wall;
   a substantially C-shaped flange located on the second end of the substantially C-shaped outer wall;
   said spacing means comprising at least one substantially C-shaped flange located on the inner surface of the substantially C-shaped outer wall between each of the at least two magnets, thereby preventing the magnets from coming into contact with each other.

* * * * *